S. S. WALDMAN.
AUTOMOBILE BUFFER.
APPLICATION FILED NOV. 1, 1912.
1,059,413.
Patented Apr. 22, 1913.
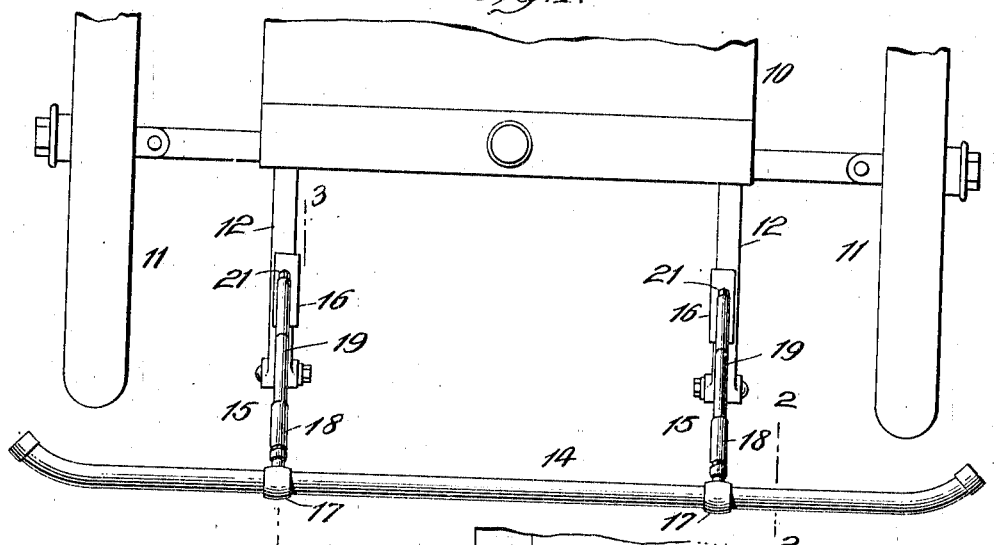
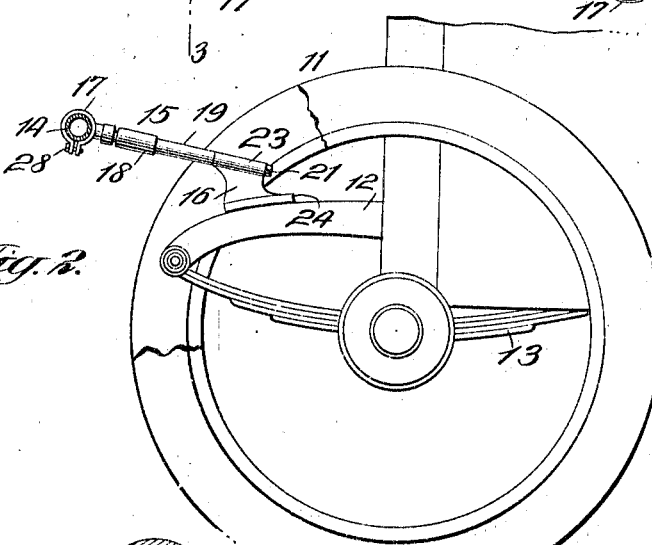
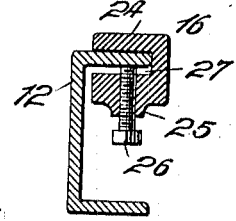
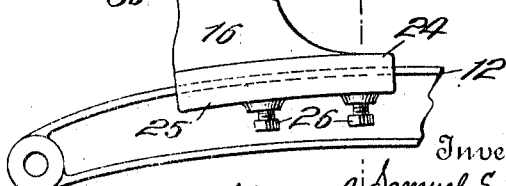
Witnesses:
Inventor
Samuel S. Waldman
By his Attorney

UNITED STATES PATENT OFFICE.

SAMUEL S. WALDMAN, OF NEW YORK, N. Y., ASSIGNOR TO EMIL GROSSMAN COMPANY, OF NEW YORK, N. Y., A CORPORATION OF NEW YORK.

AUTOMOBILE-BUFFER.

1,059,413.  Specification of Letters Patent.  Patented Apr. 22, 1913.

Application filed November 1, 1912. Serial No. 729,047.

*To all whom it may concern:*

Be it known that I, SAMUEL S. WALDMAN, a citizen of the United States, and a resident of New York city, in the county of New York and State of New York, have invented certain new and useful Improvements in Automobile-Buffers, of which the following is a specification.

The invention relates to buffers or bumpers for use on automobiles and the like, and pertains more particularly to the type of buffer wherein a horizontal buffer bar is yieldably mounted forwardly or in advance of the springs supporting the front portion of the automobile body.

The object of the invention is to produce a very durable buffer of the class referred to and one which is composed of comparatively few and easily assembled parts and capable of ready attachment to the side sills of automobile frames.

The buffer of my invention comprises the forwardly projecting horizontally disposed buffer bar and two supporting members therefor to be connected with the side sills of the automobile frame and each consisting preferably of a bracket adapted for ready adjustment to the side sill, a head to be clamped on the buffer bar, two telescopic sleeves or tubes intermediate said head and bracket, a spiral spring inclosed within said sleeves and a long bolt extending longitudinally through said bracket, sleeves and spring and connected at its threaded end to said head, said bolt being slidable in said bracket, so as to permit of the yielding action of the spring and effect the yieldable mounting of the buffer bar.

One advantage of my invention is that the telescopic sleeves or tubes inclosing the spring are held in place without the use of screws or like securing means, and another advantage of the invention is that the brackets connecting the buffer bar with the side sills may be readily attached to and detached from said sills and adjusted thereon with the use of bolts without injury to or weakening said sills.

The invention will be fully understood from the detailed description hereinafter presented, reference being had to the accompanying drawings, in which:

Figure 1 is a top view of the forward portion of an automobile equipped with a buffer mechanism embodying my invention; Fig. 2 is a side view, partly broken away and partly in section on the dotted lines 2—2 of Fig. 1, of the same; Fig. 3 is an enlarged longitudinal section through a portion of the same on the dotted line 3—3 of Fig. 1, and Fig. 4 is a transverse section through the side sill and securing bracket on the dotted line 4—4 of Fig. 3.

In the drawings, 10 designates the forward portion of an automobile, 11 the front wheels, 12 the forward and downwardly curved end portions of the usual side sills or bars of the automobile frame, 13 the customary semi-elliptic springs pivoted at their forward ends to the outer ends of said bars or sills 12, and 14 the horizontal buffer bar mounted forwardly of the vehicle by the means constituting my invention and supported from the side sills or bars 12.

The bracket members supporting the buffer bar 14 are designated generally by the numeral 15 and these members correspond with each other and each comprises a main bracket 16 secured to a side sill 12, a head 17 fastened to the bar 14, telescopic sleeves or tubes 18, 19 intermediate the bracket 16 and head 17, a spring 20 confined within said sleeves or tubes and a bolt 21 which extends through the bracket 16, spring 20 and sleeves 18, 19 and has its forward end screwed into an internally threaded hub 22 which forms an integral part of the head 17. The bracket 16 is a casting having an upwardly and forwardly inclined upper tubular part 23 through which the bolt 21 passes and a lower base portion 24 which bears upon the upper surface of the sill 12 and carries a lower parallel leaf 25 which extends below the upper flanged portion of the sill 12 and carries securing bolts 26 by which the bracket 16 may be readily clamped to the sill 12, as may be clearly understood by reference to Figs. 3 and 4. The leaf 25 is formed on the base portion of the bracket 16 by the creation in the side thereof of a longitudinal recess 27 of proper depth and curvature to somewhat snugly pass laterally upon the upper flange of the sill 12. The bracket 16 is one integral casting, and hence is entirely durable, and when said bracket is formed with the special base portion 24 it may be very readily secured to the side sill 12 without cutting into the latter or otherwise modifying it. The special base portion 24 permits the bracket 16 and parts carried thereby to be readily adjusted longitudinally along the sill 12 so as to locate the buffer bar 14 in its most desirable or effective relation to the automobile. Each head 17 is in the form of a split ring adapted to receive and clamp the bar 14 and having an internally threaded hub 22 to receive the forward end of the bolt 21. Each head 17 is adapted to be clamped upon the bar 40 by means of a bolt 28.

The sleeve or tube 18 at its forward end snugly fits upon the hub 22 of the head 17 and said sleeve or tube 18 adjacent to the outer end of the hub 22 is creased inwardly to form an annular shoulder 29 which bears against said end of said hub, the formation of said shoulder also increasing the strength and durability of said sleeve or tube. The sleeve or tube 19 at its forward end fits within the rear end of the sleeve or tube 18, and at its rear end said tube 19 is formed with the inwardly extending annular shoulder 30 which bears against the forward end of the tubular portion 23 of the bracket 16. The spring 20 is a coiled spring and its rear end bears against the shoulder 30 formed on the sleeve or tube 19 and at its forward end bears against the shoulder 29 formed on the sleeve or tube 18, and hence said spring operates to preserve the proper relation of the sleeves or tubes 18, 19 to each other and to the head 17 and bracket 16. The shoulder 30 on the sleeve 19 and the shoulder 29 on the sleeve 18 add to the strength of said parts and in addition afford efficient bearing surfaces for engagement with the bracket 16 and hub 22, respectively, and also provide bearing surfaces for the ends of the spring 20. It will be seen that in the construction of the sleeves 18, 19 presented by me, said sleeves are not rigidly fastened to the bracket 16 and head 17, but are merely assembled in proper relation thereto and held in such relation by the spring 20 after the application of the bolt 21 to position.

The buffer mechanism of my invention may be assembled directly on the automobile or prior to being applied thereto as may be desired, and it will be observed that in assembling the several parts of the mechanism no tools are required other than wrenches for tightening the bolts 21, 26, 28, this being a feature of advantage not only in applying the buffer to an automobile, but in removing the same therefrom when that is necessary.

The buffer mechanism of my invention is composed of few durable readily assembled and disassembled parts, and while I do not limit the invention in every respect to the special formation of the base portions 24 of the brackets 16, it is of advantage when applying the mechanism to a car whose side sills are formed with upper flanges, to construct said base portions with the recesses 27 to pass laterally upon the side sills so as to be secured thereto merely by tightening the bolts 26.

What I claim as my invention and desire to secure by Letters-Patent, is:

1. An automobile buffer, comprising in combination a buffer-bar and supporting members therefor secured to the forward end of the vehicle and each comprising a bracket secured to the vehicle, a head secured to the bar, telescopic tubes between said head and bracket and inclosing a coiled spring, and a bolt extending through said bracket, tubes and spring and secured to said head, said head having a rearwardly projecting hub, and the forward one of said tubes at its forward end receiving said hub and being creased inwardly to bear against the same and afford a bearing for the forward end of said spring, and the rear one of said tubes being flanged inwardly at its rear end to bear against the forward end of said bracket and afford a bearing for the rear end of said spring.

2. An automobile buffer, comprising in combination a buffer-bar and supporting members therefor secured to the forward end of the vehicle and each comprising a bracket secured to the vehicle, a head secured to the bar, telescopic tubes between said head and bracket and inclosing a coiled spring, and a bolt extending through said bracket, tubes and spring and secured to said head, said head having a rearwardly projecting hub, and the forward one of said tubes at its front end receiving said hub, and the rear one of said tubes being flanged inwardly at its rear end to bear against the forward end of said bracket and afford a bearing for the rear end of said spring.

3. An automobile buffer, comprising in combination a buffer-bar and supporting members therefor secured to the forward end of the vehicle and each comprising a bracket secured to the vehicle, a head secured to the bar, telescopic tubes between said head and bracket and inclosing a coiled spring, and a bolt extending through said bracket, tubes and spring and secured to said head, said head having a rearwardly projecting hub and the forward one of said tubes at its outer end receiving said hub and being creased inwardly to form an annular shoulder engaging the end of said hub and affording a bearing for the forward end of said spring.

4. An automobile buffer, comprising in combination a buffer-bar and supporting members therefor secured to the forward portions of the side-sills of the frame of an automobile and each comprising a bracket secured to one of said side-sills, a head secured to said bar, telescopic tubes between said head and bracket and inclosing a coiled spring, and a bolt secured to said head and extending through said tubes and spring and the upper portion of said bracket above said side-sill, said bracket having an upper tubular portion at its upper end above the side sill to receive said bolt and an integral lower base portion conformed to the upper flange of said side-sill and recessed to pass laterally thereon from the inner side thereof and provided with securing means.

Signed at New York city, in the county of New York and State of New York, this 31st day of October A. D. 1912.

SAMUEL S. WALDMAN.

Witnesses:
CHAS. C. GILL,
ARTHUR MARION.